United States Patent
Klaus et al.

(10) Patent No.: US 10,751,656 B2
(45) Date of Patent: Aug. 25, 2020

(54) JET ENGINE WITH A CHAMBER

(71) Applicant: Rolls-Royce Deutschland Ltd & Co KG, Blankenfelde-Mahlow (DE)

(72) Inventors: Christoph Klaus, Teltow (DE); Jonas Schwengler, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 220 days.

(21) Appl. No.: 15/926,485

(22) Filed: Mar. 20, 2018

(65) Prior Publication Data

US 2018/0280851 A1 Oct. 4, 2018

(30) Foreign Application Priority Data

Mar. 28, 2017 (DE) .......................... 10 2017 106 664

(51) Int. Cl.
*B01D 50/00* (2006.01)
*B01D 45/14* (2006.01)
(Continued)

(52) U.S. Cl.
CPC ............ *B01D 45/14* (2013.01); *B01D 45/08* (2013.01); *B01D 46/003* (2013.01); *B01D 50/002* (2013.01); *F02C 7/06* (2013.01); *F05D 2220/323* (2013.01); *F05D 2260/40311* (2013.01); *F05D 2260/602* (2013.01);
(Continued)

(58) Field of Classification Search
CPC .... B01D 45/14; B01D 50/002; B01D 46/003; B01D 45/08; F02C 7/06; F05D 2260/609; F05D 2260/40311; F05D 2260/602; F05D 2260/98; F05D 2220/323; Y02T 50/671
See application file for complete search history.

(56) References Cited

U.S. PATENT DOCUMENTS 5,716,423 A 2/1998 Krul et al.
6,470,666 B1 10/2002 Przytulski et al.
(Continued)

FOREIGN PATENT DOCUMENTS

DE 10330829 A1 2/2005

OTHER PUBLICATIONS

German Search Report dated Jan. 19, 2018 for counterpart German Patent Application No. DE 10 2017 106 664.0.
(Continued)

*Primary Examiner* — Dung H Bui
(74) *Attorney, Agent, or Firm* — Shuttleworth & Ingersoll, PLC; Timothy J. Klima (57) ABSTRACT

A jet engine with a chamber which is delimited by a housing and inside of which a rotatable appliance that can be impinged by hydraulic fluid is arranged, wherein hydraulic fluid and air introduced through the housing into the chamber can be discharged from the chamber. In the area through which air and hydraulic fluid can be discharged from the chamber, the housing is embodied with a separating appliance in the area of which air and hydraulic fluid can be separated from each other, and/or a deflector appliance, by means of which air, hydraulic fluid and/or an air-oil mixture in the chamber can be guided in the direction of the area in a targeted manner, is provided upstream of the area of the housing.

7 Claims, 4 Drawing Sheets

(51) Int. Cl.
F02C 7/06 (2006.01)
B01D 45/08 (2006.01)
B01D 46/00 (2006.01)

(52) U.S. Cl.
CPC .... *F05D 2260/609* (2013.01); *F05D 2260/98* (2013.01); *Y02T 50/671* (2013.01)

(56) References Cited

U.S. PATENT DOCUMENTS

| | | | |
|---|---|---|---|
| 2008/0016878 A1* | 1/2008 | Kirby | F01D 17/105 60/782 |
| 2009/0133961 A1* | 5/2009 | Corattiyil | B01D 45/14 184/6.26 |
| 2009/0250296 A1 | 10/2009 | Hannaford et al. | |
| 2014/0155213 A1 | 6/2014 | Sheridan | |
| 2015/0007531 A1 | 1/2015 | Beier et al. | |
| 2015/0135663 A1* | 5/2015 | Beier | B01D 45/14 55/461 |
| 2016/0376924 A1 | 12/2016 | Miller et al. | |

OTHER PUBLICATIONS

European Search Report dated Jul. 9, 2018 for counterpart European Patent Application No. 18163248.0.

* cited by examiner

JET ENGINE WITH A CHAMBER

This application claims priority to German Patent Application DE102017106664.0 filed Mar. 28, 2017, the entirety of which is incorporated by reference herein.

The invention relates to a jet engine with a chamber that is delimited at least in certain areas by a stationary wall area, as disclosed herein.

A jet engine as it is known from practice has, among others, areas or chambers in which bearing appliances, various machine elements such as gear wheels, splines and the like, are arranged, among others. During operation of the jet engine, the bearing appliances and machine elements are impinged by or supplied with hydraulic fluid or oil for cooling and lubricating, for example via oil nozzles or the like. To prevent any undesired leaking of oil from the chambers in the direction of the environment of the chambers, which represents an oil-free area of the jet engine, the chambers are sealed against the environment by means of suitable sealing appliances. In addition, during operation of a jet engine, the ambient pressure of the chambers is respectively set to a pressure level that is higher than the respective pressure in the interior of the chambers. In this manner, any undesired oil leakage from the chambers is additionally counteracted in a simple and safe manner. For constructional reasons, the higher ambient pressure respectively causes a flow of pure air to flow from the environment into the bearing chambers. To avoid an undesired pressure increase inside the chambers that is thus created, the chambers respectively have at least one air outlet via which the inflowing air is discharged again.

As the pure air flowing into the chambers is enriched with oil inside the chambers during operation of the jet engine, it is not only air, but also oil that is discharged from the chambers via the air outlets. Hence, the oil content of the fluid volume flows being discharged from the chambers into the direction of the environment of the jet engine via the air outlets has to be reduced to a minimum by respective measures before discharge.

For this purpose, the air-oil mixtures from the chambers are first supplied to an oil separator or a so-called breather, in the area of which oil is separated from the air-oil mixtures to the required extent. The oil that is separated in the area of the oil separator is recirculated into the oil circuit, whereas the cleaned air is discharged into the environment overboard.

In addition, the chambers are also respectively embodied with at least one oil outlet, via which oil that does not flow out via the air outlets is respectively discharged from the chambers in the direction of the oil circuit. Usually, the oil outlets are arranged in a lower area of the bearing chambers in the installation position of the jet engine, so that oil that is separated in the area of the bearing chamber walls flows in the direction of the oil outlets due to gravity without additional measures, collects there and can be suctioned off to the defined extent via an oil pump. Likewise, oil atomized to minor degree which does not flow with the air in the direction of the air outlet collects in this area and is discharged from the chamber via the oil outlet. Thus, an oil volume flow through the bearing chambers that is necessary for maintaining the functions of the bearing appliances can respectively be set in the bearing chambers during operation.

For constructional reasons, in the known jet engine a large part of the amount of oil that is respectively introduced into the bearing chambers is mixed with air and conducted from the bearing chambers in the direction of the oil separator. This results in a correspondingly high separation performance of the oil separator, which, however, impairs the efficiency of the jet engine to an undesired extent.

What is known from DE 103 30 829 B4 is a bearing arrangement for a gas turbine, in which two oil-permeable elements are assigned to an external stationary bearing ring. The oil-permeable elements have a substantially L-shaped cross section. A leg of the oil-permeable elements extends in the axial direction and is firmly connected to the stationary outer bearing ring. Alternatively, the leg that extends in the axial direction can also abut the outer bearing ring and be attached to the stator. Connecting to the leg are radially extending legs of the oil-permeable elements. The legs extend in the radial direction. The oil-permeable elements are stationary and surround the outer stationary bearing ring, the rolling bodies as well as the internal rotating bearing ring of the bearing arrangement at least in certain sections or certain areas. In this manner, it is ensured that the oil flowing around the rolling bodies for the purpose of lubrication and cooling reaches the interior side of the oil-permeable elements after having flown around the rolling bodies. At first, the oil is collected on the interior side of the oil-permeable elements and then permeates them. After having permeated the oil-permeable elements, the oil collects on an exterior side of the same and can be discharged in a targeted and controlled manner on the exterior side of the oil-permeable elements as an oil flow. By means of the oil-permeable elements, it is to be avoided that the oil flowing around the roller bearings is dispersed, nebulized or foamed in the entire bearing space. Rather, the oil is captured by the oil-permeable elements and pooled into an oil film or oil flow that can be discharged in a controlled manner. By means of the bearing arrangement, the dwell time or residence time of the oil in the area of the bearings is to be shortened.

Further, due to the shorter dwell time of the oil in the bearing, less heat is transferred to the oil. Accordingly, smaller oil coolers can be used in a gas turbine, and thus the weight of the gas turbine can be reduced. Thanks to the reduced heat dissipation to the oil, the coking risk as well as the danger of fire at the gas turbine is also reduced.

However, as a result of the proposed shielding of the bearing, the housing walls delimiting the bearing space are disadvantageously not impinged with oil and cannot be temperature-controlled by means of the same. During unfavorable operating condition developments of the gas turbine, this may possibly lead to an increase of the operating temperature of the housing walls up to temperature values that cause oil positioned on the housing walls to be coked to an undesired extent and to stay back as deposition.

To avoid coking of oil at the housing walls, there is the possibility of temperature-controlling the housing walls as required, for example by means of a suitable additional oil cooling and/or air cooling. However, this entails the problem that an additional oil cooling which includes the housing walls being impinged by an oil volume flow in the bearing internal space in turn results in a larger oil volume in the area of the bearing, which has a negative effect on the efficiency of the gas turbine. An additional oil cooling of the housing walls from the outside is also undesirable, since for this purpose an additional constructive effort is required for the conduction of the cooling oil as well as for the sealing of the oil-conducting area, which increases the manufacturing costs of a gas turbine. An additional air cooling also causes an undesired additional constructive effort as well as leakages, wherein ultimately the structural measures that have to be provided for this purpose result in a considerable increase of the total weight of a jet engine.

It is the objective of the present invention to provide a cost-effective jet engine which can be operated with a high degree of efficiency and has a low oil loss during operation, and in which the coking of hydraulic fluid is prevented cross the entire operating range.

This objective is achieved through a jet engine with features as disclosed herein.

The jet engine according to the invention is embodied with a chamber which is delimited by a housing and inside of which a rotatable appliance that can be impinged with hydraulic fluid or oil is arranged, wherein hydraulic fluid and air introduced into the chamber through the housing can be discharged from the chamber.

According to the invention, in the area through which air and hydraulic fluid can be discharged from the chamber, the housing is embodied with a separating appliance in the area of which air and hydraulic fluid can be separated from each other, and/or a deflector appliance by means of which air, hydraulic fluid and/or an air-oil mixture can be conducted in the chamber in the direction of the area in a targeted manner is provided upstream of the area of the housing.

In the jet engine embodied according to the invention, the hydraulic fluid or oil that is provided for lubricating the rotating appliance is centrifuged off the rotating appliance during operation with a high momentum in the direction of an inner wall of the housing that delimits the chamber. Depending on the respectively provided embodiment of the jet engine according to the invention, the centrifuged-off hydraulic fluid directly impinges onto the interior side of the housing, the separating appliance or onto the deflector appliance. Here, the inner wall of the housing is cooled to the required extent by the directly impinging hydraulic fluid that is centrifuged off from the rotating appliance. Due to the high momentum, parts of the hydraulic fluid that wet the inner wall of the housing are again separated from the inner wall of the housing, deflected off the housing with a smaller drop diameter, and form an air-oil mixture together with the air that is present in the chamber. Further, the liquid hydraulic fluid transitions into the gaseous aggregate state depending on the present operating state inside the chamber, so that the air-oil mixture that is created inside the chamber does not only carry along finely dispersed oil droplets, but also gaseous oil.

The oil load of the air-oil volume flow that is introduced into the separating appliance from the chamber is reduced as it passes the separating appliance, wherein the oil that is separated in the area of the separating appliance is recirculated into the oil circuit to the desired extent. The air-oil volume flow that is pre-cleaned in the area of the separating appliance is conducted on in the direction of a so-called breather with a lower oil loading as compared to the air-oil volume flow that is flowing from the interior of the chamber into the separating appliance. In the area of the breather, the oil loading of the air-oil volume flow supplied to the same is lowered to a desired level before the air flow is discharged with a low oil loading to the environment of the jet engine.

If the jet engine according to the invention is embodied with a deflector appliance, the hydraulic fluid volume flow that is centrifuged off by the rotating appliance and directly impinges onto the deflector appliance and is correspondingly deflected there, is at least partially separated from the air-oil mixture due to the higher density as compared to the flowing-along air, and an air-oil volume flow is discharged from the chamber that has a lower oil loading as compared to the solutions as they are known from the state of the art.

If the jet engine according to the invention is embodied with the deflector appliance as well as with the separating appliance, the previously described separation of oil before the discharge of an air-oil volume flow from the chamber first takes place in the area of the deflector appliance and subsequently additionally also in the area of the separating appliance.

Here, the air-oil volume flow that is deflected in the area of the deflector appliance flows in the direction of the separating appliance and there impinges on the same with high momentum before being discharged from the chamber. Thus, the high momentum that is applied to the hydraulic fluid and the air by the rotatable appliance, among others, is used for the further separation of oil in a constructionally simple manner in the area of the separating appliance despite the deflector appliance.

Depending on of the respectively present application case, there is also the possibility that, due to a construction-related pressure gradient between the pressurized internal space of the chamber and the area of the air outlet that is positioned outside the chamber, the momentum is applied to the hydraulic fluid and the air inside the chamber not only by the structural components that are arranged inside the chamber and rotate during operation.

Independently of the respective embodiment of the jet engine according to the invention with the separating appliance or with the deflector appliance or with a combination of separating appliance and deflector appliance, the oil separator is supplied with an air-oil volume flow having a lower oil loading as compared to known solutions. Due to the low oil loading of the air-oil mixture that is flowing out of the chamber in the direction of the oil separator, the oil separator can be designed with a low separation performance and the jet engine according to the invention can be operated with a high degree of efficiency. Further, the partial pre-cleaning of the air discharged form the chamber in the area of the chamber according to the invention in total also results in a lower oil consumption of a jet engine embodied according to the invention during operation. The lower oil consumption of a jet engine in turn makes it possible to design an oil tank of the jet engine to be smaller, which has a positive effect on the total weight of a jet engine.

Further, [through] the direct impingement of the inner wall of the housing with hydraulic fluid from the rotatable appliance, the housing is cooled to the desired extent, and a coking of hydraulic fluid is avoided in a simple manner and without additional cooling measures even during unfavorable operating condition developments of the jet engine according to the invention.

In an advantageous embodiment of the jet engine according to the invention, the flow of air, hydraulic fluid and/or an air-oil mixture can be transferred into a substantially tangential flow along the housing in the area of the deflector appliance upstream of the area of the housing, wherein for this purpose the deflector appliance can be embodied with a bent area having a radius so as to achieve a high separation performance of oil from the air-oil volume flow, on the one hand, and, on the other hand, to slow down the air-oil volume flow as little as possible, so that the deflector appliance substantially provides the function of a centrifugal separator.

Thus, there is the possibility of deflecting the oil that is centrifuged off by the rotatable appliance at least in certain areas substantially outwards in the radial direction during operation of the jet engine or the outflowing air-oil mixture in the area of the deflector appliance for example by approximately 90°. Through the deflection of the oil or the air-oil mixture, a part of the oil is advantageously also separated in the area of the deflector appliance and a partial pre-separation of the oil from the air is achieved before discharge from the chamber. Further, it can be achieved in a simple manner by means of the deflector appliance that the oil and/or an air-oil mixture is supplied to the separating appliance with a flow direction that ensures a high separation performance of the separating appliance.

In a constructionally simple embodiment of the jet engine according to the invention, the deflector appliance has a channel that is delimited by at least two deflector elements, wherein one end of the channel ends in the chamber and the other end of the channel ends in the area of the housing. Moreover, the flow of the air-oil mixture can be deflected in the area of the channel into the preferred tangential flow direction along the interior side of the housing to the desired extent. In a cost-effective further development of the jet engine according to the invention that can be manufactured with small effort, the deflector elements are embodied in a sheet-metal like manner.

The separating appliance can be embodied as a coalescence separator appliance, in which a separation of air and oil is based on a large surface in the area of the separating appliance.

In an embodiment of the jet engine according to the invention that can be realized in a constructionally simple manner, the separating appliance is embodied with a grid structure and/or with a cell structure. Alternatively or additionally, it can also be provided that the separating appliance is embodied with a foam-like or sponge-like element.

In a further embodiment of the jet engine according to the invention that is easy to manufacture and is characterized by a low mounting effort, the separating appliance and/or the deflector appliance is embodied integrally with a housing. Here, there is the possibility of manufacturing the housing together with the separating appliance and/or the deflector appliance by means of an additive manufacturing method, in particular by means of a 3D print. In such an embodiment of the jet engine according to the invention, the separating appliance and/or the deflector appliance represents an integral part of the housing, so that the separating appliance and/or the deflector appliance take over structural functions of the housing and are load-bearing.

Alternatively, it can also be provided that the separating appliance and/or the deflector appliance are connected at the housing in the area of the housing, for example by means of a welding or an adhesive method, and preferably inside a recess of the housing.

In one embodiment of the jet engine according to the invention that can be operated with small effort, a pumping appliance for suctioning off hydraulic fluid from the chamber through the area of the housing is provided. Thus, it is achieved and ensured in in a simple manner that a defined oil volume is not exceeded inside the chamber.

In a further advantageous embodiment of the jet engine according to the invention, the housing has multiple areas, wherein respectively at least one separating appliance and/or respectively at least one deflector appliance are assigned to each area.

Here, the areas are respectively arranged in particular in sections of the housing that are impinged mainly with hydraulic fluid and/or an air-oil volume flow by the rotatable appliance during operation of the jet engine. Here, there is also the possibility that the housing has a plurality of are circumferentially distributed areas through which air and hydraulic fluid can be discharged from the chamber. In particular with a larger number of separating appliances and deflector appliances, which may for example be embodied integrally with the housing, the areas act as flame arrester and counteract the propagation of noise. Further, the areas provide a high degree of stability and at the same time a low weight.

If the chamber is embodied as a bearing chamber of the jet engine and the rotatable appliance is a bearing appliance, a desired supply of the bearing with hydraulic fluid can be ensured without causing a coking in the area of the bearing chamber wall and without polluting an environment of the jet engine with hydraulic fluid to an undesired extent.

In a further embodiment of the jet engine according to the invention, the chamber is formed by a housing that surrounds at least a part of a transmission appliance, wherein the transmission appliance can for example be an auxiliary unit drive.

Alternatively, there is also the possibility that, for connecting a shaft of the jet engine that is coupled to a turbine, the transmission appliance is provided with a fan and is in particular embodied as a planetary gear.

Apart from a bearing appliance, the rotating appliance can also be a gear wheel of a transmission appliance, a shaft, or the like.

The features specified in the patent claims as well as the features specified in the following exemplary embodiments of the jet engine according to the invention are suitable respectively on their own or in any combination with each other for furtherer developing the subject matter according to the invention.

Further advantages and advantageous embodiments of the jet engine according to the invention follow from the patent claims and from the exemplary embodiments that are described in principle in the following by referring to the drawing, wherein with a view to clarity, the same reference signs are used for structural components having the same structure and functionality in the description of the different exemplary embodiments.

Herein.

Figure 1:
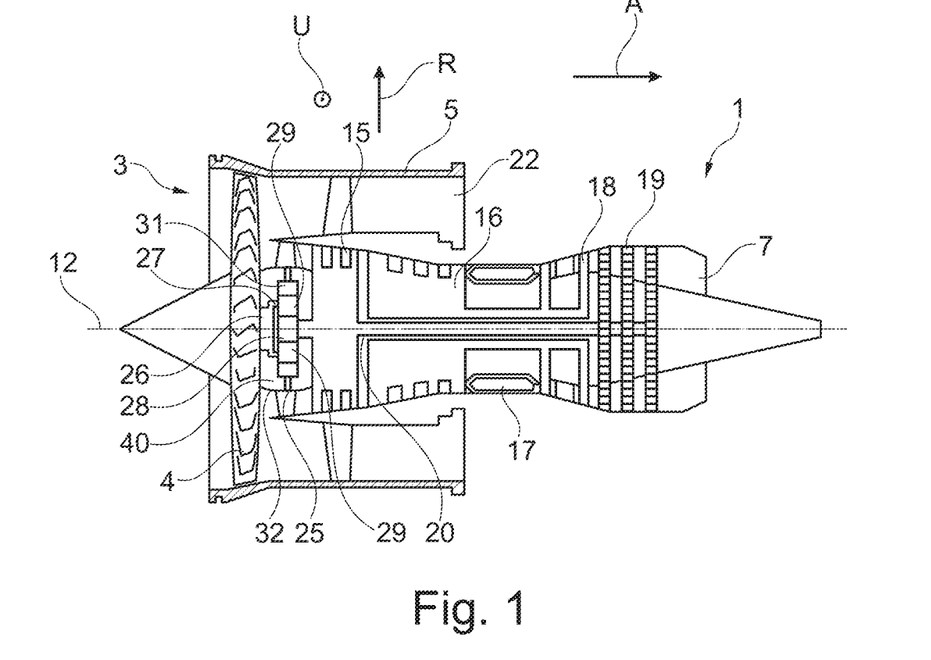
FIG. 1 shows a simplified sectional view of a jet engine with a fan and with a low-pressure turbine, wherein the fan is in operative connection with the low-pressure turbine via a planetary gear device.

FIG. 1 shows a jet engine 1 or gas turbine engine that has a main axis and a rotational axis 12. Further, in the axial flow direction A, the jet engine 1 comprises an air intake 3, a fan 4, a planetary gear device 25, an intermediate-pressure compressor 15, a high-pressure compressor 16, a combustion appliance 17, a high-pressure turbine 18, a low-pressure turbine 19, and a discharge nozzle 7. An engine nacelle 5 surrounds the gas turbine engine 1 and delimits the intake 3.

The jet engine 1 operates in a conventional manner, wherein air entering the intake 3 is accelerated by the fan 4 to create two air flows. A first air flow flows into the intermediate-pressure compressor 15, and a second air flow is conducted through a bypass channel 22 or subsidiary flow channel to provide a drive thrust. The intermediate-pressure compressor 15 compresses the air flow supplied thereto before the air is further compressed in the area of the high-pressure compressor 16.

The compressed air that is discharged from the high-pressure compressor 16 is introduced into the combustion appliance 17, where an intermixing with fuel occurs, and the fuel-air mixture is combusted. The resulting hot combustion products expand and in doing so drive the high-pressure turbine 18 and the low-pressure turbine 19, before they are discharged via the discharge nozzle 7 to provide additional drive thrust. The high-pressure turbine 18 and the low-pressure turbine 19 respectively drive the high-pressure compressor 16 or the intermediate-pressure compressor 15 via a suitable connecting shaft 20, 21. The low-pressure shaft 20 that couples the low-pressure turbine 19 to the intermediate-pressure compressor 15 also drives the fan 4 via the planetary gear device 25.

Here, the low-pressure shaft 20 is connected to a sun wheel 28 of the planetary gear device 25, whereas the fan 4 is in operative connection with a circumferential planet carrier 27 of the planetary gear device 25 in the area of a fan shaft 26. At that, the planet carrier 27 acts together with multiple planetary wheels 29 of the planetary gear device 25 that are arranged in a circumferentially distributed manner via bearing appliances that are not shown in any more detail. In the shown embodiment of the planetary gear device 25, a hollow wheel 31 of the planetary gear device 25 is arranged at a housing appliance 32 in a manner firmly attached to the housing. In alternative embodiments of the transmission device, the planet carrier or the sun wheel can also be embodied in a manner firmly attached to the housing.

With the shown coupling of the fan shaft 26 and the low-pressure shaft 20 of the low-pressure turbine 19 to the planetary gear device 25, a drive torque of the stationary gear ratio of the planetary gear device 25 that is applied to the planetary gear device 25 via the low-pressure shaft 20 is correspondingly increased and supplied to the fan shaft 26, while the speed of the low-pressure shaft 20 is larger than the speed of the fan shaft 26 by the factor of the stationary gear ratio of the planetary gear device 25. If the fan 4 is driven by the low-pressure turbine 19, the speed of the low-pressure shaft 20 is reduced corresponding to the gear ratio of the planetary gear device 25 in the area of the planetary gear device 25, and the fan shaft 26 as well as the fan 4 are driven with this reduced speed and with a torque that is increased with respect to the torque applied to the low-pressure shaft 20.

Figure 2:
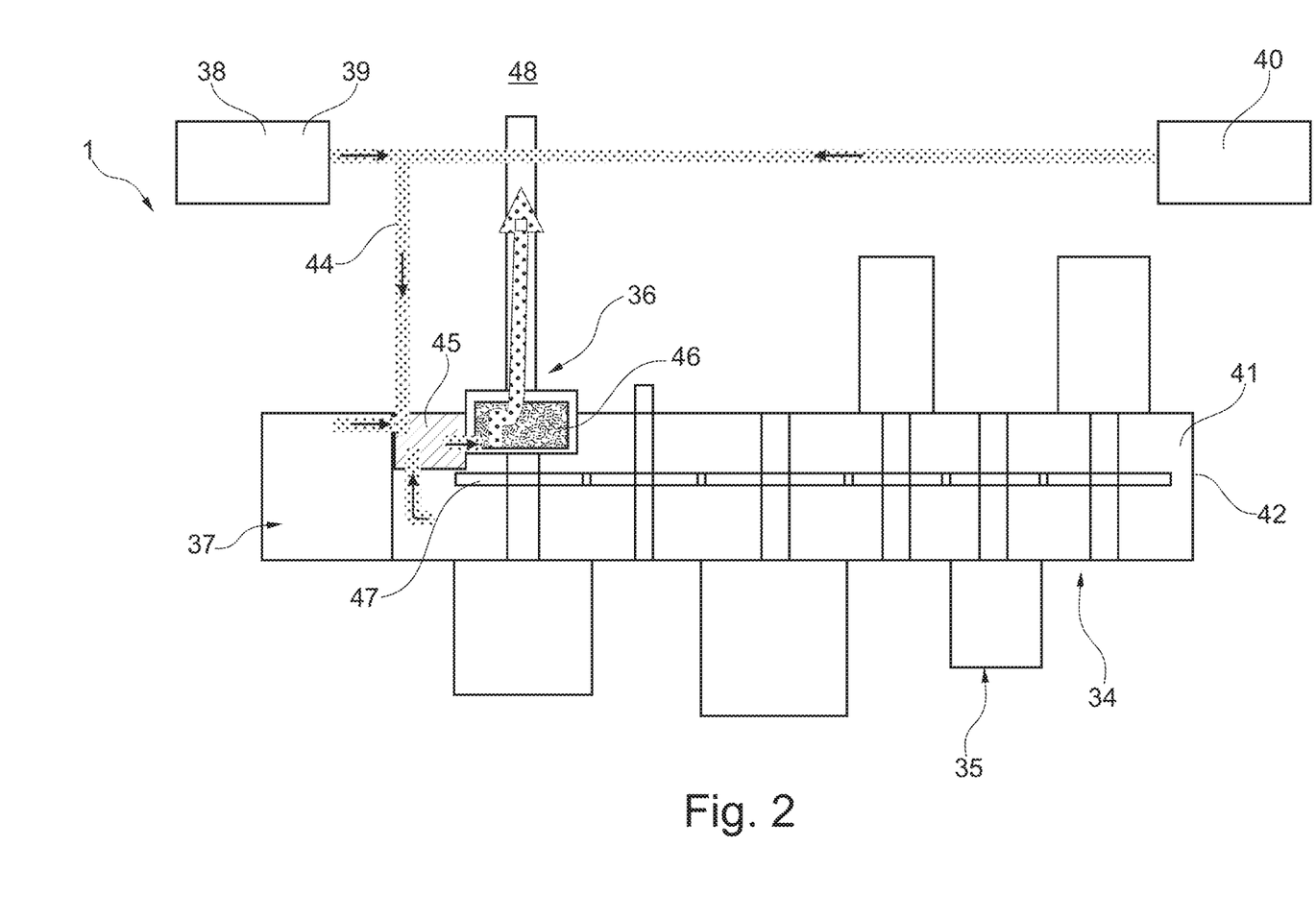
FIG. 2 shows a strongly schematized partial view of the jet engine according to FIG. 1 with an oil separator that is arranged in the area of an auxiliary unit transmission appliance.

In FIG. 2, an auxiliary unit transmission appliance 34 can be seen in more detail, with a hydraulic pump being arranged in its area. By means of the hydraulic pump, bearing appliances and gear wheel pairs of the planetary gear device 25, among other components, can be supplied with hydraulic fluid for cooling and lubricating during operation of the jet engine 1.

The auxiliary unit transmission appliance 34 supplies torque to the desired extent to various auxiliary units 35 and an oil separator 36, which is also referred to as a breather. In addition, an oil tank 37 is also provided in the area of the auxiliary unit transmission appliance 34, representing a hydraulic fluid reservoir from which oil for cooling and lubricating various areas of the jet engine 1 is extracted, such as for example bearing appliances for mounting the low-pressure shaft 20 and the high-pressure shaft 21, gear wheel pairs of the auxiliary unit transmission appliance 34, the planetary gear device 25 as well as further assembly groups of the jet engine 1 that are to be cooled and lubricated.

In the present case, the oil separator 36 is connected to the oil tank 37, a front bearing chamber 38, a rear bearing chamber 39, an internal space of the planetary gear device 25 that forms a chamber 40, as well as an internal space 41 of a housing 42 of the auxiliary unit transmission appliance 34, which all represent areas of the jet engine 1 that are impinged by oil. The bearing appliances and tooth meshings or bearings of the planetary gear device 25 that are arranged in the bearing chambers 38, 39 are impinged with oil from the oil tank 37 for lubricating and cooling during operation of the jet engine 1.

In the embodiment according to FIG. 2, an air-oil volume flow from the bearing chambers 38, 39 and the chamber 40 can be respectively guided via the conduit area 44, which in the present case opens into a pre-chamber 45 that is arranged upstream of the oil separator 36. The pre-chamber 45 is connected to the oil separator 36, in the internal space of which a porous area 46 is arranged in a rotatable manner, through which an air-oil volume flow discharged from the pre-chamber 45 can flow.

In the present case, the porous area 46 can be driven by the auxiliary unit transmission appliance 34 via a gear wheel 47 and acts as a centrifuge, so that the share of the oil of the air-oil volume flow flowing through the porous area 46 can be reduced as much as possible. At that, the oil content of the air-oil volume flow is reduced in the oil separator 36 in the area of the porous area 46 for one thing like when an impact filter is passed, and for other like in the area of a centrifuge through the rotation of the porous area 46 by separating of the oil from the air. The oil that is filtered out of the air-oil volume flow in the area of the porous area 46 is suctioned off in the outer area of the oil separator 36 via a pumping appliance in a manner that is not illustrated in more detail, and is conducted back into the oil tank 37. The air flow that flows from the oil separator 36 in the direction of the environment 48 has a very low oil load.

Figure 3:
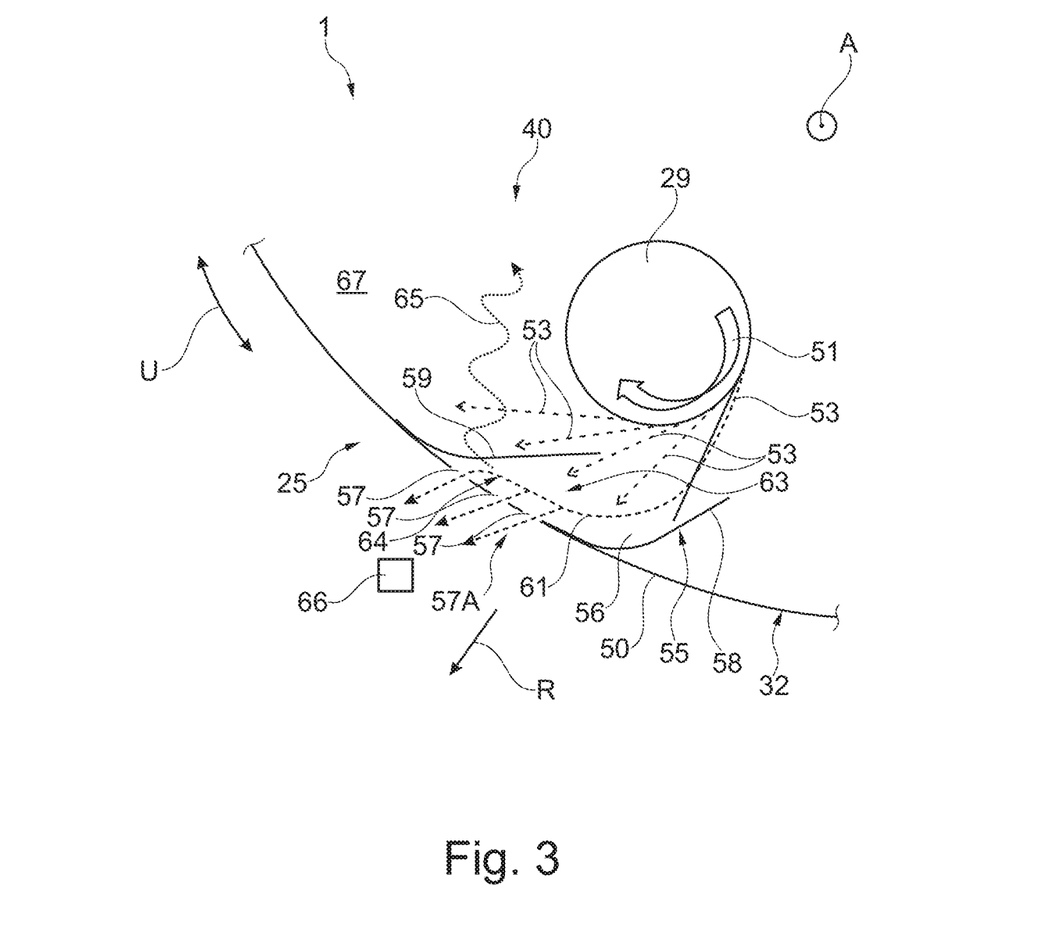
FIG. 3 shows a strongly simplified cross sectional view of a first embodiment of a chamber of the jet engine according to FIG. 1.

FIG. 3 shows a section of a first embodiment of the chamber 40 of the planetary gear device 25 that has an internal space 67, wherein, in an area that is located externally in a radial direction R, the chamber 40 is delimited by a stationary wall area 50 of the stationary housing appliance 32. A rotating appliance 28, 29, 31, in particular a planet wheel 29 of the planetary gear device 25, that rotates relative to the housing appliance during operation of the jet engine 1 is schematically arranged within the chamber 40 in the radial direction R. During operation, the planet wheel 29 rotates with high speed in the rotational direction 51, wherein the oil that is supplied to the planet wheel 29 for cooling and lubricating is substantially tangentially centrifuged off from the planet wheel 29, and flows with a high momentum substantially in the radial direction R of the jet engine 1 from the planet wheel 29 in the direction of the wall area 50 in the manner indicated by the arrows 53.

The wall area 50 has a deflector appliance 55 that comprises a channel 56 for guiding the centrifuged-off oil or an air-oil mixture in the direction of outlet openings 57 of an area 57A of the housing appliance or of the housing 32 that are arranged in the wall area 50. In the present case, the deflector appliance 55 that is connected to the wall area 50 has two deflector elements 58, 59 that delimit the channel 56 in the circumferential direction U. The deflector elements 58, 59 are embodied to be bent in such a manner in the radial direction R and in the circumferential direction U that the flow direction 53 of the air-oil mixture that flows into the channel 56 is deflected at least partially by the first deflector element 58 into a substantially tangential flow direction 61 in the area of the outlet openings 57 with respect to the wall area 50.

Through this deflection of the air-oil mixture by for example approximately 90°, the oil of the air-oil mixture that has a higher density than the air is separated at the first deflector element 58 or at the wall area 50, and forms an oil film there that flows in the direction of the outlet openings 57.

Here, the first deflector element 58 is embodied to be bent and in particular to have such a large radius that, when the oil that is centrifuged off by the planet wheel 29 or the oil of the air-oil mixture impinges onto the first deflector element 58, the oil sticks to the deflector element 58 and does not detach again and is not centrifuged back in the form of dispersed small oil drops. This is advantageous, since smaller oil drops are harder to separate form the air-oil mixture than oil drops with larger diameters.

The oil that is separated in the area of the deflector appliance 55 as well as the remaining air-oil mixture are conducted to a separating appliance 63 with a still high momentum in a substantially tangential direction with respect to the static or stationary wall area 50 that does not rotate during operation of the jet engine 1. The separating appliance 63 is firmly connected to the wall area 50 in the area 57A or in the area of the outlet openings 57 on a side that is facing towards the internal space 67 of the chamber 40. Further, in the present case, the separating appliance 63 is embodied with a grid structure 64 or a foam-like structure having a large surface. The air-oil mixture flows through the grid structure 64, whereby a further portion of the oil that is carried along by the air-oil mixture is separated from the air-oil mixture in the area of the grid structure 64 that acts as a coalescing filter. Subsequently, air or an air-oil mixture with a low oil content flows out of the channel 56 in the direction indicated by arrow 65 and remains in the chamber 40.

On a side of the outlet openings 57 that is facing away from the chamber 40, a pumping appliance 66 is arranged, which is shown only schematically and by means of which the oil that is separated in the area of the deflector appliance 55 and the oil that is separated in the area of the separating appliance 63 is discharged from the chamber 40 and supplied to the oil tank 37.

In the present case, the deflector appliance 55 and the separating appliance 63 are manufactured integrally with the wall area 50 by means of an additive manufacturing process, wherein the wall area 50 can in particular be load-bearing in the area of the separating appliance 63 and can take over structural functions. In addition, the wall area 50 has a high stability in the area of the grid structure 64 while at the same time having a low weight. If the grid structure 64 is for example manufactured by means of a laser deposition method, the deflector appliance 55 and the separating appliance 63 can be designed with high degrees of freedom.

Apart from the shown embodiment, also multiple deflector appliances 55 and multiple separating appliances 63 arranged in a circumferentially distributed manner about the housing 32 can be provided. Further, there is also the possibility of providing a substantially completely circumferential separating appliance 63. In that case, the wall area 50 represents a flame arrester. In addition, such an embodiment of the wall area 50 has a noise-absorbing effect, whereby a noise propagation can be reduced in a simple manner.

In an alternative embodiment of the invention, a wall area of the front bearing chamber 38 and/or of the rear bearing chamber 39 can also be embodied in a comparative manner to the wall area 50 of the chamber 40.

Figure 4:
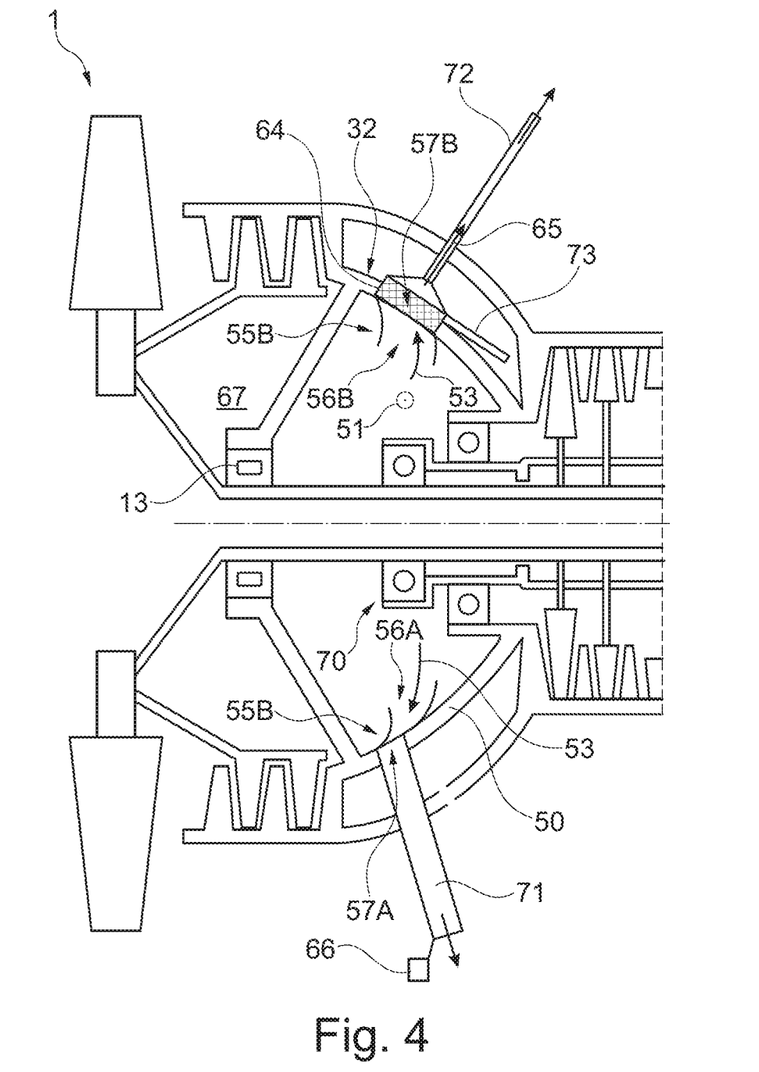
FIG. 4 shows a strongly simplified cross sectional view of a second embodiment of a chamber of the jet engine according to FIG. 1.

FIG. 4 shows a further embodiment of the chamber 40, with its housing 32 being embodied with a first area 57A and a second area 57B. Here, in the installation position of the jet engine 1, the first area 57A is provided in a lower area of the chamber 40, while the second area 57B is positioned in an upper area of the chamber 40. The first area 57A and the second area respectively comprise one deflector appliance 55A or 55B with respectively one channel 56A or 56B that is embodied so as to be bent to the previously described extent, respectively having a functional principle that corresponds to a helical air separator. Here, the curvature of the channels 56A and 56B corresponds to a main flow direction of an air-oil mixture that is flowing out of a bearing appliance 70 in the radial direction of the chamber 40.

Via the first area 57A, substantially only separated oil is discharged from the chamber 40 in the area of the deflector appliance 55A to the extent that is described in more detail in connection with FIG. 3, and is recirculated into the oil circuit via an oil recirculation line 71, while the air with a low oil loading that flows into the channel 56A flows from the channel 56A back into the internal space of the chamber 40.

In contrast to that, oil as well as an air-oil mixture is discharged from the chamber 40 through the second area 57B, wherein the oil loading of the air-oil mixture that is discharged from the chamber 40 through the second area 57B is lower than the oil loading of the air-oil mixture that flows from the chamber 40 into the channel 56B of the deflector appliance 55B. This is due to the fact that at first oil is separated from the air-oil mixture in the area of the deflector appliance 55B to the extent that has been described with respect to FIG. 3. The second area 57B is additionally also embodied with a separating appliance 63B, in the area of which the oil loading of the air-oil mixture supplied through the channel 56B in a substantially tangential manner is further reduced. Subsequently, the air-oil mixture that is pre-cleaned in the area of the deflector appliance 55B and the separating appliance 63B is conducted in the direction of the breather via a further line 72, while the oil that is separated from the air-oil mixture in the area of the deflector appliance 55B and the separating appliance 63B is recirculated into the oil circuit via a further oil recirculation line 73.

PARTS LIST 1 jet engine
3 air intake
4 fan
5 engine nacelle
7 discharge nozzle
12 rotational axis
15 intermediate-pressure compressor
16 high-pressure compressor
17 combustion appliance
18 high-pressure turbine
19 low-pressure turbine
20 low-pressure shaft
21 high-pressure shaft
22 bypass channel
25 transmission device; planetary gear device
26 fan shaft
27 planet carrier
28 sun wheel
29 planet wheel
31 hollow wheel
32 housing appliance
34 auxiliary unit transmission appliance
35 auxiliary units
36 soil separator
37 oil tank
38 front bearing chamber 39 rear bearing chamber
40 chamber
41 internal space of the auxiliary unit transmission appliance
42 housing of the auxiliary unit transmission appliance
44 conduit area
45 pre-chamber
46 porous area of the oil separator
47 gear wheel
48 environment
50 wall area of the chamber
51 rotational direction
53 flow direction
55, 55A, 55B deflector appliance
56, 56A, 56B channel
57 outlet opening
57A, 57B area
58 first deflector element
59 second deflector element
61 flow direction
63, 63A separating appliance
64 grid structure
65 flow direction
66 pumping appliance
67 internal space of the chamber
70 bearing appliance
71 oil recirculation line
72 further line
73 further oil recirculation line
A axial direction of the jet engine
R radial direction of the jet engine
U circumferential direction of the jet engine

The invention claimed is:

1. A jet engine comprising:
a chamber which is delimited by a stationary housing with a stationary wall area;
a rotatable device positioned in the chamber that is impinged by hydraulic fluid during operation,
wherein hydraulic fluid and air that is introduced through the stationary housing into the chamber is dischargeable from the chamber,
wherein, in at least one area through which air and hydraulic fluid can be discharged from the chamber, the stationary housing includes at least one seperating device for separating air and hydraulic fluid from each other,
wherein the at least one separating device includes at least one chosen from a grid structure and a cell structure which is fixedly connected to the stationary wall area to be a load bearing part of wherein the at least one separating device includes a foam or sponge element.

2. The jet engine according to claim 1, wherein the at least one separating device includes a coalescence separator device.

3. The jet engine according to claim 1, wherein the at least one separating device is integral with the stationary housing.

4. The jet engine according to claim 1, and further comprising a pumping device for suctioning off hydraulic fluid from the chamber through the at least one area of the stationary housing.

5. The jet engine according to claim 1, wherein the at least one area of the housing include a plurality of areas and the at least one separating device include a plurality of separating devices with one of the plurality of separating devices assigned to each of the plurality of areas, respectively.

6. The jet engine according to claim 1, wherein the chamber is a bearing chamber of the jet engine.

7. The jet engine according to claim 1, wherein the stationary housing surrounds at least a part of a transmission.

* * * * *